United States Patent Office 2,812,479
Patented Nov. 5, 1957

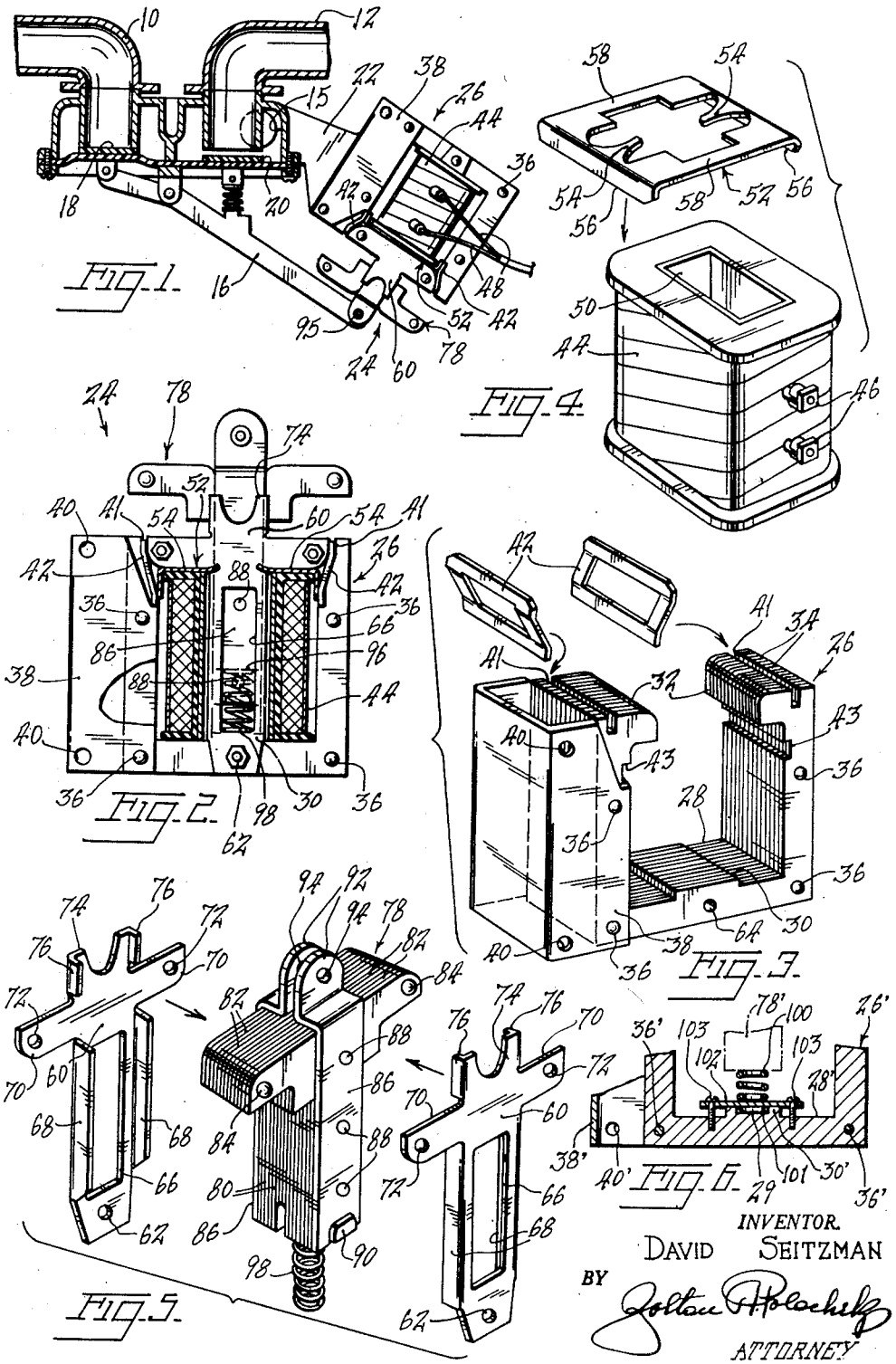

2,812,479

SOLENOID ASSEMBLY FOR WASHING MACHINE AND THE LIKE CONTROL MECHANISM

David Seitzman, Brooklyn, N. Y.

Application November 22, 1954, Serial No. 470,388

1 Claim. (Cl. 317—191)

This invention relates to mechanisms for electric washing machines, particularly those machines of the fully automatic type. More particularly, the invention has reference to a solenoid device which is particularly adapted to insure proper operation of the same over a long period of time, despite the corrosive action of the dampness of the environment in which the solenoid is housed in the machine.

A continuing problem is connection with washing machine mechanisms arises from the fact that corrosion or other types of deterioration occurs in the solenoid mechanisms used for controlling the closing and opening of valves, etc., in the washing machine. Said corrosion results from the fact that the solenoid is required to operate in a comparatively damp atmosphere, and it is not uncommon for the solenoid as presently constructed to require replacement at undesirably frequent intervals, owing to faulty operation of the same resulting from said corrosion. When corrosion sets in, the core of the solenoid, being normally extended when deenergized, tends to bond when energized to the core-contacting, adjacent portion of the solenoid frame or housing. Consequently, after corrosion to an excessive extent has occurred, the solenoid does not respond properly to deenergization, and the core is not instantaneously moved outwardly of the housing to its proper position when deenergized. This, in turn, results in improper operation of the valves, and oftentimes, even though the solenoid core is retracted when the solenoid is energized and extended when the solenoid is deenergized, the solenoid in its energized condition does not seat properly, and fails, in turn, to properly seat the valve connected thereto.

The main object of the present invention is to provide an improved solenoid designed particularly for use in washing machine mechanisms, which solenoid will, at all times, operate efficiently, and will not be affected adversely by corrosion.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a sectional view through a two-way valve assembly of a washing machine, to which assembly is connected a solenoid according to the invention, the solenoid being shown in side elevation.

Fig. 2 is an enlarged view, partly in vertical section and partly in side elevation, of the solenoid per se.

Fig. 3 is an enlarged exploded perspective view of the solenoid housing and one of the yokes therefor.

Fig. 4 is an enlarged, exploded perspective view of the solenoid coil and associated hold-down springs.

Fig. 5 is an exploded perspective view of the solenoid core and the associated guides therefor.

Fig. 6 is a fragmentary vertical sectional view of a solenoid, showing a modified form of the invention.

In Fig. 1 there is shown a two-way valve assembly similar to that shown in U. S. Patent 2,662,384, issued December 15, 1953, to H. E. Morrison et al. Said assembly does not per se constitute part of the present invention, and is illustrated only to show the portions of the washing machine mechanism with which the solenoid is used. Said two-way valve assembly includes hoses 10, 12, which would extend from the washing machine into different, adjacent laundry tubs, not shown. The hoses are connected to a two-way valve assembly 14, having a single entry 15, and valve discs 18, 20 for the hoses 10, 12 respectively. The valve discs are operable to permit water entering the valve to be selectively passed through either hose 10 or 12, the valve 18 being closed when valve 20 is open and vice versa. The opening of one and the closing of the other valve occurs simultaneously, since both valves are connected to a single operating arm 16 fulcrumed upon the valve assembly intermediate the valve discs. Rocking of arm 16 in one direction about its fulcrum seats valve disc 18, and rocking of the arm in an opposite direction seats valve disc 20. The rocking of the arm occurs automatically responsive to energization or deenergization of a solenoid mounted on a bracket 22 carried by the valve assembly, the solenoid being designated generally at 24 and constituting the improvement which is the subject of the present patent application.

The solneoid 24 includes a rectangular solenoid housing 26 having a rectangular, coil-receiving opening 28 extending fully therethrough, the bottom of the recess or opening 28 having a raised ledge 30 and the top of the recess being formed open and being defined at opposite sides thereof by inwardly extending overhangs 32.

The solenoid housing is composed of a plurality of side-by-side plates 34 having registering edges, the several plates being identically formed and being fixedly secured to one another by rivets 36. The plates are substantially U-shaped, thus defining the rectangular, upwardly opening recess 28. At one side of the opening 28, the plates are straddled by a channeled support member 38, the adjacent rivets 36 passing through said member to fixedly secure the same to the plates.

Formed in the side walls of the supporting member 38, adjacent the web of said member, are openings 40, the openings of each side wall being disposed adjacent the opposite ends of the member 38 and being aligned transversely of said member 38 with the corresponding openings of the other side wall. Said openings are adapted to receive connecting elements, whereby the member 38 is fixedly connected to the supporting bracket 22.

Rectangular yokes 42, one shown in Fig. 3, are provided for the overhangs 32, said yokes having rectangular center openings receiving the overhangs and being of zigzag cross section, with the top portion of each yoke engaging in a transverse recess 41 formed in the upper end of each leg of the U-shaped frame, and the bottom portion of each yoke being engaged in transverse recesses 43 facing inwardly of the coil recess 28.

The coil has been shown per se in Fig. 4, and is designated at 44. The coil includes the usual terminals 46 for connection of electrical conductors 48, and is provided with an axial, end-to-end bore 50 of rectangular cross section lined with fiber or other electrical insulation. Preferably, the windings of the coil are exteriorly taped as shown, to avoid the deleterious action of dampness or water.

The coil seats snugly in the coil recess 28 of the solenoid housing, and to hold the coil firmly seated in said housing, there is provided a spring plate 52 with a pair of opposed leaf spring projections 54 each of which has at its outer edge a depending flange 56 engaging against the adjacent side of the coil, as shown in Fig. 2. The hold-down spring projections 54 at their confronting edges, and the spring plate 52, are formed with connecting end bridges 58, for a purpose to be made presently apparent.

Engageable in the axial bore 50 are confronting guide plates 60 each of which has at its lower end an opening 62 registering with a transverse, through opening 64 formed in the bight portion of the solenoid housing. A bolt or equivalent connecting element is extended through the registering openings 62, 64 to secure the guide plates in place.

Each guide plate is formed from a single piece of sheet metal material, and has an elongated, longitudinally extending opening 66 intermediate its opposite ends. At opposite sides of the opening, each guide plate has inwardly facing guide flanges 68, and at the upper ends of the guide flanges, the plates are formed with oppositely, laterally projecting wings 70 each of which has at its free end an opening 72. When the guide plates are secured in place, bolts are extendible through the openings 72 as well as through registering openings formed in the overhangs 32, for extension of connecting bolts therethrough, whereby to connect the guide plates to the solenoid housing at both ends of the guide plates.

Extending above the wings, on each guide plate, is an upper end portion 74, having inwardly turned lips 76.

The guide plates are adapted to embrace between them the solenoid core generally designated 78. The core is formed from a plurality of identically shaped, laminated plates 80, the plates 80 having elongated body portions aligned with the elongated body portions of the guide plates, the body portions of the plates 80 merging at their upper ends into outwardly, oppositely projecting wings 82 riveted together at their outer extremities as at 84.

Overlying the outermost plates 80 are bars 86 fixedly secured to the plates 80 by countersunk rivets 88 and formed, at their upper ends, with inwardly offset ears 92 having aligned openings 94. The openings 94 are adapted to receive a pivot pin 95 (Fig. 1), said pivot pin extending through an opening in the arm 16 when the arm is disposed between ears 92, to pivotally connect the core to the arm.

As shown in Fig. 2, the bottom end surface of the solenoid core is formed with an axial, downwardly opening recess or socket 96, receiving the inner end of a coil spring 98, the outer end of which abuts against the ledge 30.

In assembling the device, one would first start with the solenoid frame shown in Fig. 3. As the first step, the yokes 42 are mounted on the frame in the manner previously described. Then, the hold-down springs 54 are positioned upon the upper end of the solenoid coil, and the coil and hold-down springs are inserted into the opening 28 from one side of the frame.

The guide plates 60 are now positioned in contact with the opposite faces of the solenoid core, and as will be noted in Fig. 2 and also in Fig. 5, the bars 86, at their lower ends, have outwardly projecting lugs 90 extending within the rectangular openings 66 of the guide plates. The purpose of this arrangement is to limit outward movement of the solenoid, to prevent the solenoid from dropping out of the housing and coil. In any event, the guide plates 60 and solenoid core, separately assembled as described, are inserted as a single unit in the axial bore 50, and on such insertion, the spring 98 will engage against the ledge 30, while the apertured lower end portions of the guide plates will be disposed against opposite sides of the bight portion of the solenoid housing. Connecting bolts are then extended through the openings 62, 72, and at this time, the wings of the respective guide plates will press downwardly against the respective hold-down springs 54, to cause said springs to exert tension against the upper end of the coil tending to properly seat the coil. The bridges 58 of the springs 54 engage against the outer surfaces of the respective guide plates as shown in Fig. 2 at this time.

The device is now fully assembled, and on connection of suitable conductors 48 thereto, may be attached to the bracket 22 and to the arm 16, ready for use.

In use, the solenoid is normally deenergized, and is shown in its deenergized position in Figs. 1 and 2. The spring 98, being held continuously under compression in the deenergized condition of the solenoid, urges the solenoid core outwardly, so as to cause the disc 18 to seat firmly in the deenergized condition of the solenoid against the seat provided therefor in the two-way valve assembly 14.

When the solenoid is energized, the core is retracted instantaneously, compressing the spring still further, the inner end of the solenoid now moving directly into engagement with the ledge 30 with the spring 98 being compressed for its full length within the socket 96. At this time, the arm 16 is rocked clockwise about its fulcrum, unseating disc 18 and seating valve 20.

It is important to note that when the solenoid is deenergized, a positive force is exerted against the core by the spring 98, tending to expand, causing the core to be immediately shifted out of engagement with the ledge 30. This eliminates any tendency of the core to bond to the ledge 30 by reason of corrosion or equivalent deterioration of the parts. Further, the spring 98, tending to expand, causes the arm 16 to be rocked clockwise about its fulcrum, firmly seating the valve disc 18. Heretofore, a spring has not been employed in the association of the parts illustrated in Figs. 1 and 2, so far as is known. Where springs have been used to shift the solenoid core outwardly of its associated coil and housing in the deenergized condition of the solenoid, said springs have been exteriorly disposed, where they are themselves subjected to corrosion and deterioration. In the illustrated invention, however, the spring is itself housed snugly in a location in which it is protected against the corrosive effects found in washing machines, by reason of its being confined within a recess formed in the solenoid core, with the core itself being snugly and slidably engaged between guide plates that are tightly fitted into the axial bore of a tapped coil. When the solenoid is energized, the spring is wholly confined in the recess, which is now tightly closed at its normally open end by the ledge 30, thus becoming a sealed cavity in which the spring is protectively enclosed.

It has been found that under these conditions, the solenoid will operate for a substantially longer period of time without requiring replacement, with the operation being wholly efficient throughout the life of the solenoid, than is true of these solenoids previously used in mechanisms of the type shown.

In Fig. 6, the raised ledge 30' of the solenoid housing 26' is shown with a bore 29 adapted to receive the lower end of an ejecting spring 100. The lowermost coil 101 of the spring 100 is anchored into the bore or socket 29 by a suitable metal strap 102 which passes over the coil portion 101 and the raised ledge 30'. This strap 102 is fastened in position by screws 103, at the ends of the straps. The upper end of the spring 100 is adapted to contact the bottom of the solenoid core 78'. In other respects this form of the invention is similar to the previous form and the similar parts may be recognized by corresponding reference numerals with a prime added.

It is to be understood that these solenoids may be adapted for any suitable use, besides washing machines, to facilitate the control mechanism of fluid inlets and exhaust ports of any pump and for controlling the speed of an electric motor.

While I have illustrated and described the preferred embodiments of my invention, it is to be understood that I do not limit myself to the precise construction herein disclosed and the right is reserved to all changes and modifications coming within the scope of the invention as defined in the appended claim.

Having thus described my invention, what I claim as new, and desire to secure by United States Letters Patent is:

A solenoid for a washing machine control mechanism comprising a U-shaped solenoid housing, a coil therein having an axial bore, a core axially shiftable in said bore, the core having an outer end projecting out of the bore and adapted for connection to an associated part of said mechanism, and having an inner end confined within the bore and engaging the housing in the energized condition of the solenoid, a spring held under compression between said inner end of the core and the bight portion of the housing to urge the core out of engagement with the housing in the deenergized condition of the solenoid, guide means for the core extending within said bore, and hold-down means for the coil interposed between the coil and guide means and tensioned to seat the coil firmly against the housing, said inner end of the core having an axial recess in which said spring is seated, the spring being of the coil type and having one end projecting out of said recess in the deenergized condition of the solenoid, said spring being confined wholly within the recess when the solenoid is energized, said bight portion of the housing having a raised ledge against which said other end of the spring engages.

References Cited in the file of this patent

UNITED STATES PATENTS

| 2,305,415 | Goff | Dec. 15, 1942 |
| 2,468,052 | Fisher | Apr. 26, 1949 |
| 2,692,964 | Soreng | Oct. 26, 1954 |
| 2,698,404 | Edwards | Dec. 28, 1954 |

FOREIGN PATENTS

| 665,142 | Great Britain | Jan. 16, 1952 |